Figure 1:
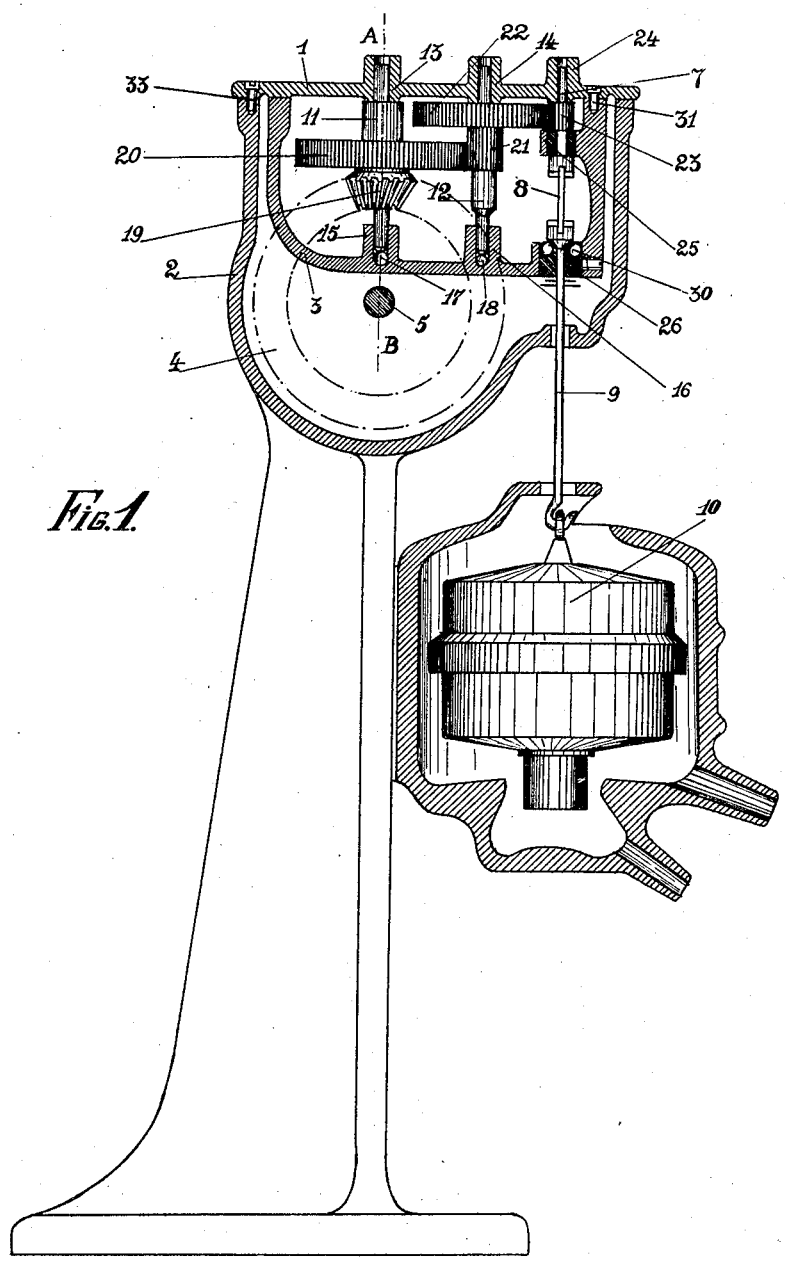

July 1, 1924.

A. MÉLOTTE

CREAM SEPARATOR

Filed April 8, 1921

1,499,391

2 Sheets-Sheet 1

INVENTOR
Alfred Mélotte
BY
ATTORNEYS.

July 1, 1924.

A. MELOTTE

CREAM SEPARATOR

Filed April 8, 1921

1,499,391

2 Sheets-Sheet 2

INVENTOR
Alfred Melotte
BY Richards Geier
ATTORNEYS.

Patented July 1, 1924.

1,499,391

UNITED STATES PATENT OFFICE.

ALFRED MÉLOTTE, OF REMICOURT, BELGIUM.

CREAM SEPARATOR.

Application filed April 8, 1921. Serial No. 459,646.

*To all whom it may concern:*

Be it known that I, ALFRED MÉLOTTE, a subject of the King of Belgium, residing at Remicourt, Province de Liege, Belgium, have invented certain new and useful Improvements in and Relating to Cream Separators; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

This invention relates to improvements in cream separators and its object is more particularly to facilitate the mounting and dismounting of the multiplying gear train device.

According to the present invention, the gear train is supported by the cover of the gear box. In this manner, when the cover of the box is removed, the gear train, as an entity may be removed at the same time.

The arrangement according to the present invention allows of avoiding many of the bearings usually provided in the walls of the gear box. Therefore, the construction of the gear box does not require such a complete finishing as that which has hitherto been required. A careful finishing is necessary only for the cover serving as a support for the gear train.

In a particular mode of carrying the invention into effect, the multiplying gears are arranged between the cover and a member fixed to the said cover; such a mode of construction is shown in the accompanying drawings.

In the cream separator which has been illustrated, the gear box is provided with a cover arranged at its upper part.

Figure 2:
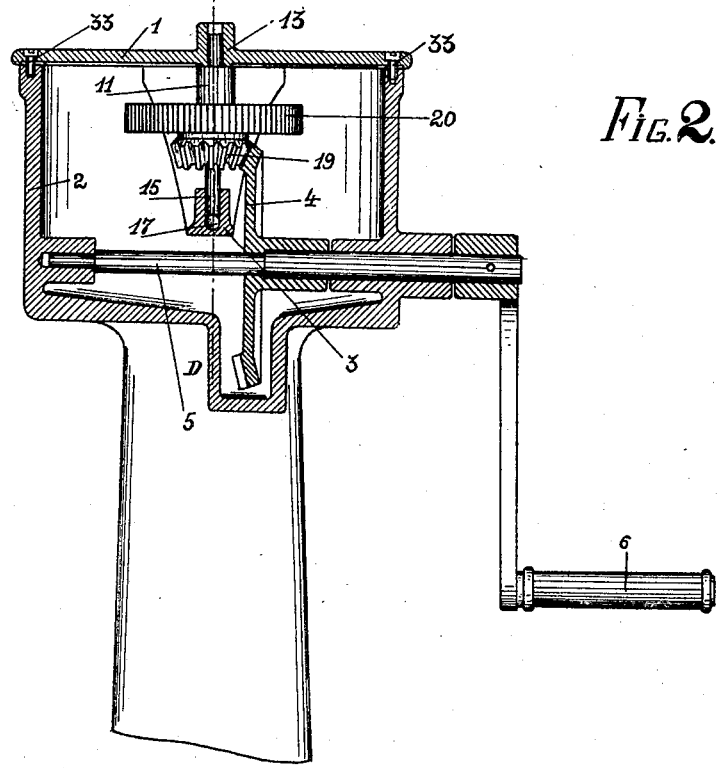
Figure 3:
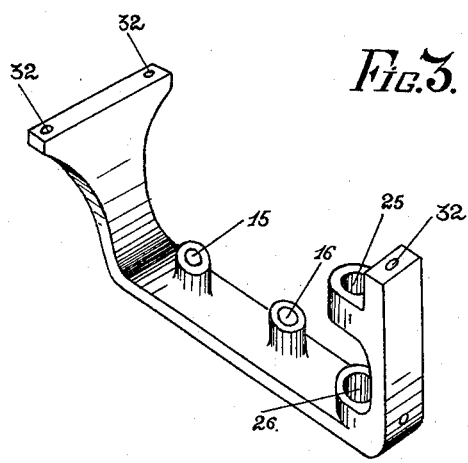

In the drawings,

Fig. 1 is a side view of the separator with a section through the gear box along the line C—D of Fig. 2, Fig. 2 is a partial section along the line A—B of Fig. 1, and Fig. 3 shows in perspective a member which is fixed to the cover and which supports the gear train.

The gear box 2 is formed of a cover 1 fixed by means of screws 33. A supporting bracket member 3 shown separately in Figure 3 is fixed to the cover 1 of the gear box.

The multiplying gear train is arranged between the said member 3 and the cover 1.

The said gear train receives its motion from the bevel gear 4 fixed upon the shaft 5 driven by the crank 6. It transmits motion to the spindle 7 which is connected by means of a transmission device 8 connected to the suspension rod 9 of the cream separator receptacle 10.

The gear train comprises two spindles 11 and 12, rotating in bearings 13 and 14 of the cover 1 and in bearings 15 and 16 of the member 3.

Balls 17, 18 are arranged at the bottom of the bearings 15 and 16 acting as step-bearing, the spindles 11 and 12 seated upon said balls and being pressed against the said balls by their own weight.

The spindle 11 is provided with a bevel pinion 19 having a small diameter, meshing with the driving bevel gear 4 of large diameter the spindle also having fixed upon it a spur gear 20 having a large diameter meshing with a spur pinion 21 of small diameter, fixed to the spindle 12.

Another spur gear 22 having a large diameter is fixed on the spindle 12 above the pinion 21, the gear 22 meshing with a spur pinion 23 having a small diameter fixed on the spindle 7 above mentioned. This spindle 7 is pivoted in a bearing 24 provided in the cover and in a bearing 25 provided in the bracket 3. The suspension rod 9 of the receptacle traverses the member 3 through an opening 26. The said rod 9 is provided at its upper part with a widened part opening against balls 30 arranged above the bearing 26. The member 3 is fixed to the cover 1 by means of screws such as 31 screwed in holes 32.

From the accompanying drawing, it will be seen that the removal of the cover causes the simultaneous removal of the whole gear.

Only the shaft 5 which is operated by the crank 6 and rotates, therefore, at a small speed, is mounted directly on the frame of the machine.

What I claim is:

A cream separator comprising in combination with a support having a chamber in its upper portion, and a pendantly supported rotatable separator bowl, of a cover detachably secured over the chamber, a shaft journalled in the walls of the chamber, said shaft having means for manual operation, a support bracket fixed on the lower side of said cover, spindles journalled at their ends respectively in said cover and bracket, one of said spindles having driving connections with said bowl, multiplying gears on said spindles, said gears constituting a train, a bevel pinion on the spindle most remote from the separator driving spindle, and a bevel gear on said shaft meshing with said pinion, said cover, bracket and gear train being removable from said support as a unit.

In testimony whereof I affix my signature in presence of two witnesses.

ALFRED MÉLOTTE.

Witnesses:
GEORGES VANDER HAEYHEN,
F. Y. ZALAND.